(12) United States Patent
Stender (10) Patent No.: US 9,726,108 B2
(45) Date of Patent: Aug. 8, 2017

(54) INTEGRATED SAFETY AND INPUT/OUTPUT MODULE FOR AN ENGINE CONTROL SYSTEM

(75) Inventor: Gregory Parker Stender, Lawrence Park, PA (US)

(73) Assignee: General Electric Company, Schenectady, NY (US)

( * ) Notice: Subject to any disclaimer, the term of this patent is extended or adjusted under 35 U.S.C. 154(b) by 767 days.

(21) Appl. No.: 13/812,189

(22) PCT Filed: Jul. 29, 2011

(86) PCT No.: PCT/US2011/045914
§ 371 (c)(1),
(2), (4) Date: Mar. 4, 2013

(87) PCT Pub. No.: WO2012/016155
PCT Pub. Date: Feb. 2, 2012

(65) Prior Publication Data
US 2013/0213344 A1    Aug. 22, 2013

Related U.S. Application Data

(60) Provisional application No. 61/369,655, filed on Jul. 30, 2010.

(51) Int. Cl.
*F02D 17/00*    (2006.01)
*F02D 45/00*    (2006.01)
*B60J 1/20*     (2006.01)

(52) U.S. Cl.
CPC ............ *F02D 45/00* (2013.01); *B60J 1/2091* (2013.01)

(58) Field of Classification Search
USPC .... 701/29.1, 29.2, 29.3, 101, 99; 123/198 D
See application file for complete search history.

(56) References Cited

U.S. PATENT DOCUMENTS 5,291,803 A * 3/1994 Yamaguchi ........... F02D 41/266
                                                      477/34
5,659,470 A * 8/1997 Goska et al. ................ 701/33.4

FOREIGN PATENT DOCUMENTS

| DE | 19640432   | 4/1998  |
| EP | 2267292    | 12/2010 |
| WO | 2004/033879 | 4/2004  |

OTHER PUBLICATIONS

PCT Search Report and Written Opinion from corresponding PCT Application No. PCT/US2011/045914, Dated Jan. 3, 2012.

* cited by examiner

*Primary Examiner* — Hung Q Nguyen
(74) *Attorney, Agent, or Firm* — Global Patent Operation; John A. Kramer (57) ABSTRACT

A safety and input/output (I/O) module of an engine controller for an engine set of a marine vessel can be physically distinct from an engine control unit (ECU). The safety and I/O module can include hardware in addition to software, firmware, or a combination thereof. The safety and I/O module can be a single logic controller having safety functionality and I/O functionality. The safety functionality can be for dynamic engine protection during operation of the engine set of the marine vessel. The I/O functionality can be for sending signals to components external to the engine controller and for receiving signals from components external to the engine controller.

26 Claims, 3 Drawing Sheets

INTEGRATED SAFETY AND INPUT/OUTPUT MODULE FOR AN ENGINE CONTROL SYSTEM

BACKGROUND

Embodiments of the invention relate to systems for engine control and management. Other embodiments relate to engine control systems for marine vessels and stationary generator sets.

Engine controllers, such as diesel engine controllers and/or marine engine controllers, include modules that perform various functions. These functions can include safety, in/out logic, engine control, and alarm functionality. Commercially available engine controllers have hardware-based solutions that provide each of the previously identified functions on standalone hardware boards. Generally, these engine controllers have been specialized components constructed for a particular engine-set. These engine controllers can be formed as unitary units, which are created on an engine-set-by-engine-set basis.

BRIEF DESCRIPTION

An embodiment of the invention relates to a system for an engine, e.g., an engine of a marine vessel and/or stationary generator set. The system comprises a safety and input/output (I/O) module that is physically distinct from an engine control unit of an engine controller of the engine. The safety and input/output module includes hardware in addition to software. The safety and input/output module is configured to dynamically protect the engine during operation of the engine, and to communicate signals with components external to the engine controller. Thus, according to one aspect, the safety and input/output module provides both safety functionality and I/O functionality, e.g., in a single controller.

Another embodiment relates to an engine controller. The engine controller comprises an engine control unit and a safety and input/output module. The engine control unit comprises hardware as well as software and is operable to regulate engine speed of an engine and to control the engine responsive to commands received from the safety and input/output module. The safety and input/output module is physically distinct from the engine control unit. The safety and input/output module is configured to receive information relating to sensed conditions from a plurality of sensors, and, if the sensed conditions are outside designated operating thresholds, convey the commands to the engine control unit to change engine operation.

BRIEF DESCRIPTION OF THE DRAWINGS

Embodiments of the invention will become better understood when the following detailed description is read with reference to the accompanying drawings, wherein.

DETAILED DESCRIPTION

Embodiments of the invention relate to a system and engine controller having a safety and input/output (I/O) module; other embodiments related to related methods. The safety and I/O module can be a single controller implementing safety and I/O functions of the engine controller; that is, in an embodiment, the safety and I/O functions are implemented in a single (one) controller of the safety and I/O module. The safety and I/O module can be combined with an engine control unit (ECU) and a human-machine interface (HMI) module when assembling the engine controller. The safety and I/O module, the ECU, and the HMI module can each be discrete components that are physically distinct from one another.

Aspects of the invention may be embodied as a system, method, or computer program product. Embodiments of the invention may comprise an entirely hardware embodiment, an entirely software embodiment (including firmware, resident software, electronically encoded logic, micro-code, etc.), or an embodiment combining software and hardware. As used herein, unless otherwise specified, "module" refers to a device or system comprising hardware and/or software. "Hardware" refers to processors or other controllers or other physical electronic parts or components, interconnected or otherwise configured to carry out designated functions. "Software" refers to electronically-accessible (e.g., readable) sets of instructions, that when accessed and executed by hardware causes the hardware to perform one or more designated functions according to the contents of the instructions. Aspects of the present invention may take the form of a computer program product embodied in one or more computer readable medium(s) having software stored thereon.

In embodiments of the invention, any combination of one or more electronically-readable (e.g., computer readable) medium(s) may be utilized. The electronically-readable medium may be an electronically-readable signal medium or an electronically-readable storage medium. An electronically-readable storage medium may be, for example, but not limited to, an electronic, magnetic, optical, electromagnetic, infrared, or semiconductor system, apparatus, or device, or any suitable combination of the foregoing. For example, a USB (universal serial bus) flash drive may be utilized to move engine control data between a non-volatile memory of the engine control unit and a configuration file of the engine controller (e.g., engine management system). In one embodiment, the HMI module can permit information to be directly uploaded and downloaded, such as to or from a USB flash drive. More specific examples (a non-exhaustive list) of the electronically-readable storage medium would include the following: an electrical connection having one or more wires, a portable computer diskette, a hard disk, a random access memory (RAM), a read-only memory (ROM), an electrically erasable programmable read-only memory (EEPROM or Flash memory), an optical fiber, a portable compact disc read-only memory (CD-ROM), an optical storage device, a magnetic storage device, or any suitable combination of the foregoing. In the context of this document, an electronically-readable storage medium may be any tangible medium that can contain/store software for use by or in connection with hardware (e.g., an instruction execution system, apparatus, or device).

An electronically-readable signal medium may include a propagated data signal with software embodied therein, for example, in baseband or as part of a carrier wave. Such a propagated signal may take any of a variety of forms, including, but not limited to, electro-magnetic, optical, or any suitable combination thereof. An electronically-readable signal medium may be any electronically-readable medium that is not an electronically-readable storage medium and that can communicate, propagate, or transport software for use by or in connection with hardware (e.g., an instruction execution system, apparatus, or device).

Software embodied on an electronically-readable medium may be transmitted using any appropriate medium, including but not limited to RF or other wireless, wireline, optical fiber cable, etc., or any suitable combination of the foregoing. Software for carrying out operations for aspects of the present invention may be written in any combination of one or more programming languages, including an object oriented programming language such as Java, Smalltalk, C++ or the like and conventional procedural programming languages, such as the "C" programming language or similar programming languages. Higher level programming languages can also be used, such as MATLAB, SIMULINK, and the like. The software may execute entirely on a local computer or other electronic device, partly on the local computer or other electronic device, as a stand-alone software package, partly on the local computer or other electronic device and partly on a remote server, remote computer, or other remote electronic device, or entirely on the remote server, other computer, or other electronic device. In the latter scenario, the remote electronic device may be connected to the local computer through any type of network, including a local area network (LAN) or a wide area network (WAN), or the connection may be made to an external electronic device (for example, through the Internet using an Internet service provider).

Aspects of the present invention are described below with reference to flowchart illustrations and/or block diagrams of methods, apparatuses/modules/systems, and computer program products, according to embodiments of the invention. It will be understood that each block of the flowchart illustrations and/or block diagrams, and combinations of blocks in the flowchart illustrations and/or block diagrams, can be implemented by software (comprising, as noted above, electronically-readable sets of instructions). The instructions may be provided to a processor of a general purpose computer, special purpose computer, or other programmable data processing apparatus or other electronic device to produce a machine, such that the instructions, which execute via the processor of the computer or other programmable data processing apparatus or other electronic device, create a means for implementing the functions/acts specified in the flowchart and/or block diagram block or blocks. Software may also be stored in an electronically-readable medium that can direct a computer, other programmable data processing apparatus, or other electronic devices to function in a particular manner, such that the instructions of the software stored in the computer readable medium produce an article of manufacture including instructions which implement the function/act specified in the flowchart and/or block diagram block or blocks. The software may also be loaded onto a computer, other programmable data processing apparatus, or other electronic device to cause a series of operational steps to be performed on the computer, other programmable apparatus, or other electronic device to produce an electronically-implemented process such that the instructions which execute on the computer or other programmable apparatus or other electronic device provide processes for implementing the functions/acts specified in the flowchart and/or block diagram block or blocks.

Figure 1:
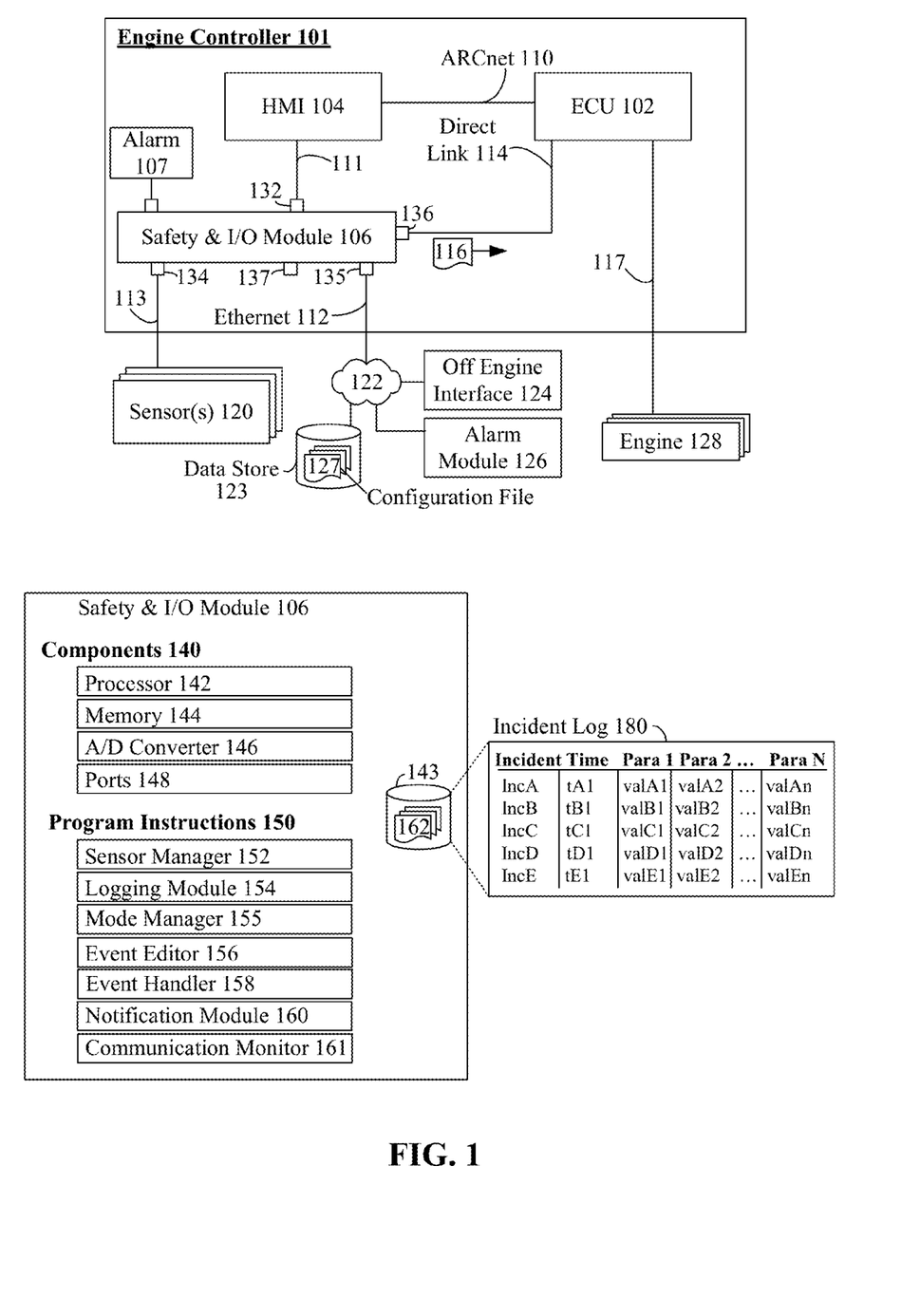
FIG. 1 shows a schematic diagram of a system for an engine controller in accordance with embodiments of the invention.

FIG. 1 shows a schematic diagram of a system 100 for an engine controller 101 in accordance with an embodiment of the invention. The engine controller 101 may be configured for operable coupling with an engine 128, for controlling the engine 128. In the illustrated embodiment, the engine controller 101 includes an engine control unit (ECU) 102 and a safety and input/output (I/O) module 106 that is physically distinct from the engine control unit 102. The safety and I/O module 106 can be a single controller having functionality both for engine protection during operation of the engine 128, and for signal communications into and out of the engine controller 101. That is, in an embodiment, the safety and I/O module 106 is configured to handle all communications to/from the engine controller 101.

The engine controller 101 can comprise hardware and/or software components configured to control at least the engine portion of a marine generator set (e.g., marine gen-set), a generator set for use in another context (e.g., stationary gen-sets), or a marine direct drive propeller. In another embodiment, the engine controller 101 can comprise hardware and/or software components configured to control any power generation system able to generate electricity from alternate forms of energy (e.g., gasoline, diesel, biodiesel, hydrogen, natural gas, or the like). For example, the power generation system can be a permanent or semi-permanent structure at a geographic location designed for the production and distribution of electricity, like an on-site small-scale power plant to provide emergency power to a factory.

The engine controller 101 can include or otherwise be protected by structural components (not shown) like a foundation, walls, and roofing, to protect internal elements from the external environment. The specific physical external and internal configurations of the various components that can comprise a given embodiment of the engine controller 101 may be selected based on the operational environment in which the engine controller is to be used and/or on the particular functionality implemented by the embodiment in question. An embodiment of an implementation for a marine application is shown in view 280 of FIG. 2, for example.

In embodiments of the system 100, the engine controller 101 includes the engine control unit (ECU) 102, the safety and input/output (I/O) module 106, and a human-machine interface (HMI) module 104. The modules 102, 104, and 106 are communicatively linked to each other. For example, the safety and I/O module 106 can connect to: the ECU 102 over a first, direct link 114 using a first port 136; the HMI module 104 via a second link 111 using a second port 132; one or more sensors 120 via a third link 113 using third port(s) 134; and to a network 122 via a fourth, Ethernet link 112 using a fourth port 135. Additionally, the HMI module 104 can connect to the ECU 102 through a fifth link 110, which can be an attached resource computer network (ARCnet) connection, or, in other embodiments, another type of communication connection.

According to one aspect of the invention, the ECU 102 is operable to regulate engine 128 speed, to stop the engine 128 in response to determined emergency conditions (e.g., under control of the safety and I/O module 106), or the like. The ECU 102 can include hardware (e.g., one or more microprocessors, memory units, analog to digital converters, output interface units, or other electronic components) and/or software. In one embodiment, the ECU includes both hardware as well as software. The ECU 102 can be tailored to the specific engine 128 and vessel/vehicle/environmental requirements with which it is to be used. If such is present in a given implementation, software of the ECU 102 can allow for adaptation of use, but can be constrained by the hardware (e.g., specifics of the engine 128). The ECU 102 may need protection from harsh environmental conditions, and may therefore need to be constructed within an environmental housing and/or be constructed to be resilient within designated environmental limits. For example, the ECU 102 may need to be cooled (actively or passively), and may need to be protected from dust, vibrations, moisture, salt, and the like.

The ECU 102 may be the only component of the engine controller 101 that is constrained by the engine 128. This arrangement permits other components of the engine controller 101, such as HMI module 104 and safety and I/O module 106, to be constructed in a standardized manner. Thus, the same HMI module 104 can be manufactured in volume and utilized for a variety of different engine controllers 101. Similarly, the same safety and I/O module 106 can be manufactured in volume and used for a variety of different engine controllers 101. Use of a common HMI module 104 and safety and I/O module 106 for supporting a wide variety of different marine vessels (or other vehicles, generator sets, or other systems in which engines 128 are used) can represent a savings in terms of inventory, manufacturing cost, maintenance, training, and the like. The software of the HMI module 104 and safety and I/O module 106 can be modified significantly (in a manner largely unconstrained by the specific engine 128 being supported) on a per-engine controller 101 basis and can be configured for each specific marine vessel (or other vehicle, generator set, or other system in which an engine is used) as needed and/or based on designated operator specifications.

The human-machine interface (HMI) module 104 can be configured as an interface that is useable by one or more users/operators (e.g., technicians, engineers, system manager, vessel operators, etc.) to tune, calibrate, optimize, view, and edit operating parameters of the engine 128. That is, values for the configurable operating parameters of the engine 128 (e.g., which is part of a power generation system) can be adjusted by a user via an integrated HMI module 104. In one embodiment, the HMI module 104 is a computational fluid dynamics (CFD) module.

In embodiments of the invention, the safety and I/O module 106 is configured to handle safety and I/O functionalities of the engine controller 101. The safety functionality may include protection of the engine(s) 128, such as engine shutdown if one or more sensed conditions (e.g., operating parameters of the engine, as sensed by the sensors 120) are indicative of conditions harmful to the engine 128. The safety functionality can also include logging and alerting features. Further, the safety functionality of module 106 can permit an authorized administrator to configure thresholds that define "out-of-bounds" conditions for the engine 128, that is, operating thresholds are designated, and if the operating thresholds are crossed (e.g., sensed conditions are outside the designated operating thresholds), a control action is initiated. Additionally, the safety and I/O module 106 can convey a shutdown command 116 to the ECU 102, as a signal over the direct link 114, upon the occurrence of one or more designated conditions, e.g., conditions where a control action is designated as warranted for safety purposes.

In embodiments, the safety and I/O module 106 is configured to provide I/O functionality that supports connection to any of a variety of external device(s) or components, which may include an off-engine interface 124, an alarm module 126, a data store 123, or the like, either directly or through the use of an appropriate data cable. In one embodiment, Transmission Control Protocol/Internet Protocol (TCP/IP) communication standards (used via the Ethernet connection 112) can be used to convey data between the controller 101 and the network 122. Other communication links (than Ethernet 112) are contemplated and may be used herein. For example, a portable flash memory device (i.e., thumb drive or memory stick) can be directly connected to the safety and I/O module 106 via a USB port 137. Other communication protocols and standards (e.g., ESATA, FIREWIRE, BLUETOOTH, WIFI, or the like) can be used for enabling communications between the safety and I/O module 106 and the network 122, data store 123, and/or other external devices.

In FIG. 1, the sensors 120 can include engine sensors, as well as various other sensors distributed throughout a vessel (or other operating environment). Each sensor 120 can be a device that produces a signal containing information/data able to be conveyed to the safety and I/O module 106 over the link 113. The information within the signal can be a value indicative of a condition, e.g., physical condition or event proximate to the sensor(s). Thus, the sensors 120 can detect or otherwise sense conditions relevant to the engines 128, and output information of the sensed conditions for conveyance to the safety and I/O module. In a marine application, sensors can include fuel sensors, speed sensors, fluid flow rate sensors, fluid temperature sensors, pressure sensors, power sensors, ambient condition sensors, or the like. The sensed conditions may include sensing operating parameters of an engine 128, and may additionally or alternatively include conditions external to the engine.

In an embodiment, the off-engine interface 124 is a programmatic interface external to the engine controller 101, which communicates with the engine controller 101 via the safety and I/O module 106. The alert module 126 is one example of an off-engine interface.

In another embodiment, the data store 123 is a persistent (non-volatile) memory space external to the engine controller 101 in which data can be maintained. The data store 123 can include, for example, a configuration file 127 of parameters of the engine controller 101. In one embodiment, the data store 123 maintains custom values for the various modules of the controller 1010 (e.g., HMI module 104, ECU 102, and safety and I/O module 106), which can be used by engineers and technicians to calibrate/optimize the engine 128 in a relatively rapid manner. In one embodiment, the data store 123 can also be used to externally maintain log information obtained from safety and I/O module 106 (specifically, information from logging module 154).

The safety and I/O module 106 may comprise a number of components 140 including one or more processors 142, one or more memories 144 (volatile and/or non-volatile), one or more analog to digital converters 146, a number of ports 148 (e.g., ports 132-127), and the like. The safety and I/O module 106 can also include a number of functional sets of programmatic instructions 150 (that is, software), which are stored upon and executable by the components 140. In one embodiment, the safety and I/O module 106 is implemented on a single integrated circuit board, which is distinct from the HMI module 104 and the ECU 102. In other embodiments, multiple boards and components can be utilized to implement the safety and I/O module 106.

The programmatic instructions 150 can include, but are not limited to, the following functionally defined modules: a sensor manager 152, a logging module 154, a mode manager 155, an event editor 156, an event handler 158, a notification module 160, a communication manager 161, or the like. Not all of these functional modules need be included in each implementation instance, and additional functional modules can be included in other contemplated embodiments without exceeding the scope of the disclosure.

Figure 3:
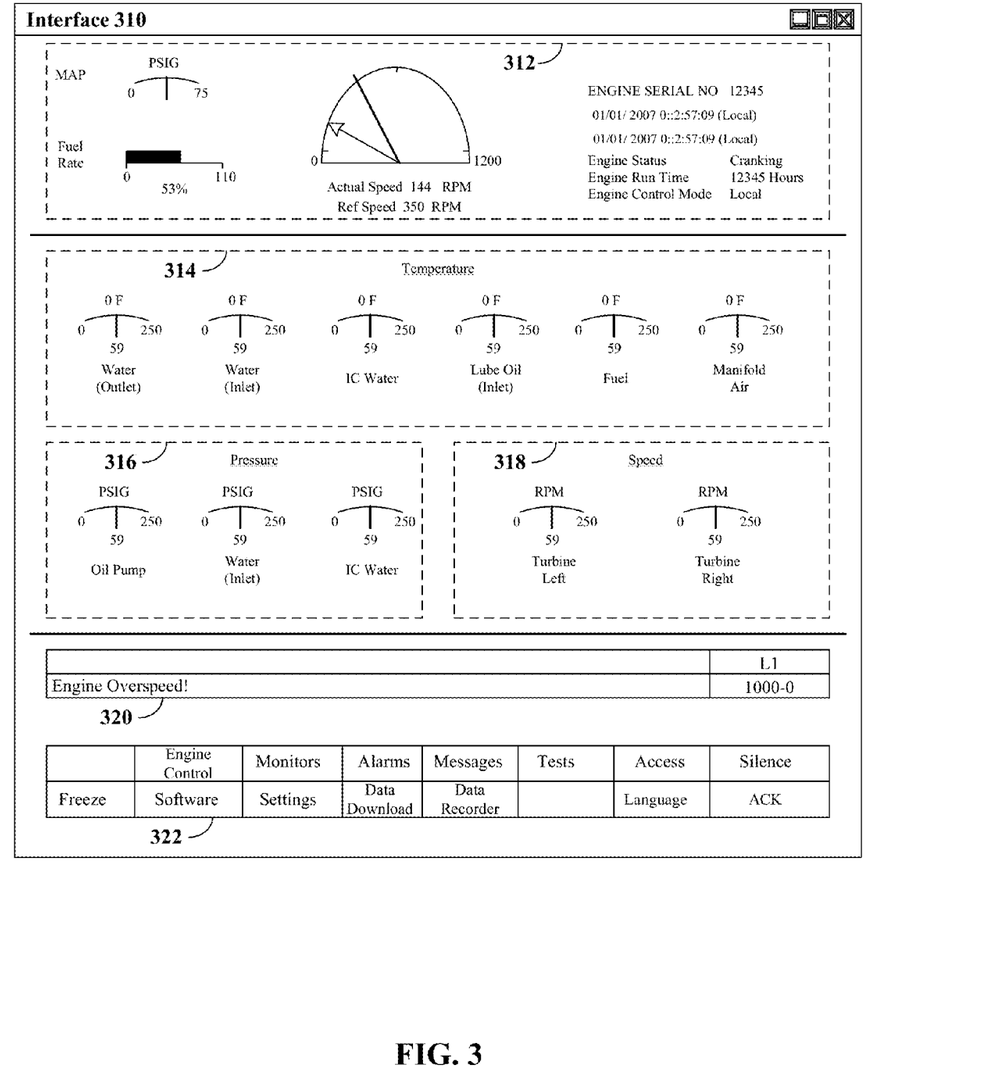
FIG. 3 is a schematic diagram illustrating an interface for facilitating unification of marine vehicle engine management in accordance with an embodiment of the invention.

In an embodiment, the sensor manager 152 is configured to control receiving and processing signals (containing data/information) received from the sensors 120. Different sensors 120 may need to be calibrated to ensure proper readings, which can also be accomplished using the sensor manager 152. The sensor manager 152 can convert the signals received from the sensors 120 to quantified values (which may require A/D conversions using the converter(s) 146). These values can be displayed; for example, the HMI module 104 may be configured to control display of a number of different sensor values, e.g., using an interface 310 as shown in FIG. 3. The values can also be used to trigger control actions (via the event handler 158) and can be logged (by the logging module 154). Additionally, the sensor manager 152 can control/adjust a sampling rate, can determine conditions for out-of-bounds values (thereby filtering anomalous values, as appropriate), and the like.

The logging module 154 is configured to log activity of the engine controller 101. This can include logging values of the sensors over time, logging administrative changes made to the safety and I/O module 106, and the like. In one embodiment, the logging module 154 maintains values of sensors in a cache or other buffer, and then selectively writes information from this cache (which can be a volatile memory, which is discarded or written over normally) to a more permanent record, such as one or more log records 162 of a non-volatile memory (or data store) 143. For example, when an incident is triggered (defined by the event handler 158 determining a potential problem exists with the engine controller 101, based on established criteria), then the logging module 154 can gather state information relevant to the incident and record it in the log records 162. A sample incident log table 180 is shown in FIG. 1, where uniquely identified records per incident can be recorded along with a set (1 ... N) of related parameters and values. This gathered state information can include past (a few seconds prior, for example) data maintained in a memory (including memory 144), which the logging module 154 has access to. The state information can also include present and future information (e.g., state information at the time of the incident and after the incident) also gathered from the sensor(s) 120 or an accessible memory.

In embodiments, the engine controller 101 is configured to be placed in multiple different modes, each of which may have different designated thresholds for logging (e.g., logging module 154), sensor management (152), event handling (event handler 158), alerts and notifications (notification module 160), and the like. The mode manager 155 can be used to manage these different modes and to ensure relevant parameters and settings of other modules are adjusted as appropriate for a current mode of the engine controller 101. In one embodiment (a marine vessel application), the different modes handled by the mode manager 155 include a "normal" operating mode (meaning a baseline operating mode), a pre-lube operating mode, and an engine start/stop mode. The engine start/stop mode can include an energy saver mode (meaning a mode where an engine is operated to reduce energy usage relative to operations in modes other than the energy saver mode), a low noise mode (meaning a mode where an engine is operated to produce a lower noise output relative to operations in modes other than the low noise mode), a fuel saver mode (meaning a mode where an engine is operated to use less fuel relative to operations in modes other than the fuel saver mode), a low exhaust emissions mode (meaning a mode where an engine is operated to produce less exhaust emissions relative to operations in modes other than the low exhaust emissions mode), and the like. Various maintenance modes and test modes can also be established and maintained by the mode manager 155. The modes managed by mode manager 155 can depend on implementation instances, and the disclosure is not to be construed as limited to the sample modes detailed herein.

The event editor 156 permits an authorized administrator to establish a set of conditions that are to be associated with the occurrence of an event. For example, an administrator can define a set of thresholds for sensor values, which is indicative of an event. The events recorded via the event editor 156 can be specific to mode, as determined by mode manager 155. Further, combinative logic can be established for various events, which can require multiple conditions (values of different parameters) to be evaluated using Boolean logic (or the equivalent), in order for the event to be true. Additionally, some events may require more than one instance of a value to occur over a time period, which ensures that events are not improperly identified based on anomalous values picked up by the sensor(s) 120.

The event handler 158 is configured to identify previously established events responsive to a satisfaction of associated conditions. An occurrence of an event can result in a corresponding programmatic action linked to this event being initiated. Events handled by the event handler 158 can include the occurrence of designated environmental conditions (external temperatures too hot or too cold, weather conditions, the presence of fire or liquid, etc.), the occurrence of designated operational conditions of the system in which an engine is being used (vessel or other vehicle damage, sudden deceleration or other motive conditions, lack of fuel, the presence of improper fuel, increased resistance on an output of the engine, such as propeller fouling, etc.), and the occurrence of designated operational conditions of the engine (internal temperature too high or too low, the presence or lack of designated air intake or exhaust constituents, the occurrence of internal damage, etc.), which may be identified based on sensed conditions being outside designated operating thresholds or otherwise. Examples of other events are described elsewhere herein. Responsive control actions may include logging events (relating to logging module 154), sensor adjustment events (e.g., adjust sampling rate, sensor sensitivity, etc.), notification events (e.g., relating to notification module 160), engine control events (causing a shutdown or other command 116 to be issued to the ECU 102 over the direct link 114), and the like.

Some events handled by event handler 158 can be specific to the engine 128 set and may be minimally modifiable by administrators. Other events may be customized events programmed via the event editor 156. Different types of users (e.g., technician, engineer, captain) can have different levels of permissions for modifying events and/or event parameters (via the event editor 156) that can affect operation of event handler 158. The programmatic actions triggered by the event handler 158 can have local effect (only affect operations of the engine controller 101), can have external effects (can cause communications/messages/commands to be sent external to the engine controller 101, such as to off engine interface 124, alarm module 126, data store 123, and the like), or can have both local and external effects.

In embodiments, the notification module 160 is configured to cause notifications and/or alerts to be issued to suitable devices/people/interface responsive to triggering events. In one embodiment, the notification module 160 permits customized notifications to be sent to different people/devices. For example, an engine overheating event can trigger one type of notification to be sent to the captain on a bridge of a marine vessel and can cause a different notification to be sent to an engine technician in the engine room of the marine vessel. The notifications issued by the notification module 160 can vary substantially depending on a mode (handled by mode manager 155) that the vessel (or engine 128) is currently operating in. The notification module 160 can communicate alerts 107 to the safety and I/O module 106 via port 138. Additionally, the notification module 160 can cause messages/commands to be sent to off-engine interfaces 124, such as to the alarm module 126.

The alarm module 126 and/or alarm module 107 are configured to respond to signals and/or commands of the safety and I/O module 106. Each alarm module 126, 107 can alert an operator and/or remote monitoring site of an engine operating parameter that is outside a set range of parameters (or otherwise of sensed conditions being outside designated operating thresholds). That is, an event identified by the event handler 158 can trigger sounding/notification of alarm module 107 and/or 126. The alerts by alarm module 107 and/or 126 can range from audio only, to audio and visual, visual only, or the like.

In an embodiment, the communication monitor 161 is a configurable module that monitors the state of communications (I/O) between different engine controller 101 components and between the engine controller 101 and external modules (e.g., alarm module 126, off engine interface 124). The state of communications (determined by communication manager 161) can affect operations of other ones of the modules, as communication problems can correspond with data anomalies being reported by the sensors 120 and with an inability of various ones of the modules 106, 104, 102 to interact with each other. For example, communication problems with ARCnet 110 (as detected and monitored by communication monitor 161) can cause operating parameters for engine control to not be conveyed between the bridge (or other primary control location) and the engines themselves. Further, the communication status (maintained by monitor 161) can be logged (by logging module 154) along with other operational parameters, which can be beneficial to technicians and engineers who are attempting to troubleshoot intermittent operational incidents, which may be difficult to replicate and/or identify in a test (or non-operational) environment.

Moreover, the communication monitor 161 can initiate alarms and other safety related actions. Because the I/O and safety functions are integrated, a level of reactiveness to communication issues not previously possible can be implemented. Further, the integration of safety functions and I/O functions in a single module 106 minimizes possible points of failure in the engine controller 101. In previous implementations, safety functions can be disrupted when communications to the safety module were hampered, which could be caused by a problem with the I/O module with a communication link between the I/O module and the safety module, and the like. In harsh environments, such as those of a marine vessel, which has heat, dust, vibration, interference, moisture, and other challenges, minimizing the points of failure can result in a significant operational gain. Further, minimizing points of failure can help maintenance personnel and engine-set engineers maintain vessels, gen-sets, and other systems more rapidly, resulting in less maintenance cost overall and less vessel downtime.

By way of an operational example for the safety and I/O module 106, an over-speed condition can be detected (by event handler 158) where the engine is run above a threshold speed level (as set by the event editor 156). Detection of this event causes (among other things) a logging of the event to occur, using logging module 154. More specifically, logging module 154 can log pre and post conditions around a period of the event being detected. The pre-sample time period may be about four seconds, while the post sample time may be relatively less at about one second. A sampling rate can be determined of about fifty microseconds. For a determinable rate, the sample rate may be low. This rate may be increased in response to a set of determined (and variable) circumstances. For example, a low rate can be used during a pre and post recording, but a relatively higher rate can be used during a period that the measured parameter is outside the threshold range.

As an example of variable circumstances, an injection of fuel or the quantity of injected fuel may affect such engine operating parameters to include engine starting capability, idling efficiency (and on/off fuel saving modes), supplied power levels, engine protection mechanisms, wear and part life, and exhaust emissions. With regard to the emissions, these emissions can include a total amount of exhaust per amount of power supplied or consumed, as well as the component breakdown of the emissions themselves. Such components can include, for example, the oxides of nitrogen (NOx) content, the CO and $CO_2$ ratio, the quantity of size of the particulate matter (PM), and the like.

It should be appreciated that large quantities, about one hundred and forty parameters (recorded in the incident log 180) for example, can be recorded as a typical log. The values for these parameters can be discrete/integer/floating point values. The incident log 180 can record a snapshot of the event (time stamp, header information, values of the one hundred and forty parameters, etc.), transport data to a quick panel (part of the HMI module 104, or controlled thereby) for display, process local controls from display, operating mode, and the like. In one embodiment, different quantities of parameters can be recorded in the pre, during, or post stages.

The safety and I/O module 106, as noted above, provides more than just logging functions. In embodiments, the safety and I/O module is configured, for example, for one or more of the following: safeguard the engine 128 from designated abnormal operating conditions; signal alarms based on sensed conditions being outside designated operating thresholds, e.g., alarms are initiated based on information received from the sensors relative to designated nominal operational parameters of the engine; override manual inputs; provide independent processing for logic confirmation; engage safety instigated shutdown procedures, or perform an engine slowdown to include a force to idle mode; perform an emergency full stop; perform a routine start/stop procedure based on selected inputs; cycle a blow down operation; engage pre-lube pumps; provide data logging; engage a bypass operation of, for example, a cold engine strategy of the pre-lube; or the like. The above is not intended to be an exhaustive list of functions supported by the safety and I/O module 106.

Additionally, the safety and I/O module 106 can generate commands (e.g., 116) to the ECU 102, for transmission over the direct link 114 or otherwise. The commands 116 can include speed reference, drop percentage, pop test, overspeed tests, and the like. Further, configuration information can be provided to the ECU 102. Configuration information can include, for example, engine type, application type, overspeed limit, acceleration/deceleration rates, and the like. Additionally, the safety and I/O module 106 can receive information from the ECU 102 and can respond to that data by directly creating an alarm signal, or if an alarm module (107 and/or 126) is present, by signaling the alarm module so that a suitable alarm is created.

As an example of ECU 102, HMI module 104, and safety and I/O module 106 interactions, an operator may request (via the HMI module 104) an amount of torque or engine speed (power request) via an accelerator pedal potentiometer or the like. The power request can be in the form of an electronic signal sent to the ECU 102. The ECU 102, based on the request and data collected from various sensors 120, can calculate in real-time the quantity of injected fuel required. The operator can input additional commands. The additional commands can include an idle speed increase to compensate for power take off (PTO) operation, or the like. Condition based monitoring systems (like controller 101) can respond to sensor data streams (from sensor signals, generated by the sensors 120, that are processed by module 106) to provide diagnostic capabilities through the ECU 102.

The vehicle speed function can be used to evaluate vehicle speed and include the possibility to activate a speed limiter, or a cruise control function, to maintain or restore a set speed. The engine ECU 102 can interface with various other vehicle systems (e.g., traction control) and can carry out self-monitoring (via the safety and I/O module 106) duties and self-diagnostic functions to keep the controller 101 working at or above a desired level. To ensure the safe operation in case of failure, "limp home" mode functions can also be integrated into controller 101. For example, in the event that a pump speed sensor (120) fails, the ECU 102 can use an alternator speed signal function for engine RPM counter as a backup signal.

With further reference to the ECU 102, the ECU may be configured to control a host of engine related functions. Such functions can include, for example, speed regulation, emergency stop conditions (other than for engine protection), basic protection (OS, COP, LOP), limp home operation, independent processing, configuration setup, interface with local controls, station interface, and interface to external electronics and peripherals (e.g., laptops or tablets).

In one embodiment, the controller 101 is configured to protect the engine 128 by monitoring several engine performance parameters while also monitoring the health of its internal components. During situations where internal controller checks or engine parameters fall outside of acceptable limits (designated operating thresholds), a warning or fault is logged. Depending on the situation, the engine 128 can be controlled to respond as one of the following: the engine 128 continues operating as it did before the warning alarm or fault indication; the controller 101 sounds and displays an alarm; the engine is automatically controlled to shut down, or is otherwise controlled to operate in a different manner than before the warning alarm or fault indication.

The safety and I/O module 106 allows the engine controller 101 to communicate as needed through a communication bus. A suitable bus (in various embodiments) can be a controller area network bus (CANBUS), MODBUS (referring to a serial communications protocol published by MODICON and protocol derivatives), or the like. The safety and I/O module 106 can act to protect the engine 128 from experiencing operating conditions known to be damaging to the engine 128. If an alarm module (107 and/or 126) is present, it can communicate that a fault is occurring or has occurred.

In one embodiment, the engine controller 101 has default conditions for warnings and alarms. Different vessels (or other systems in which an engine is used) may be required to respond to events in different ways. Each vessel/system operator can choose to either accept the default values, to edit the default values, or to specify (via custom settings) how events are to be handled.

Figure 2:
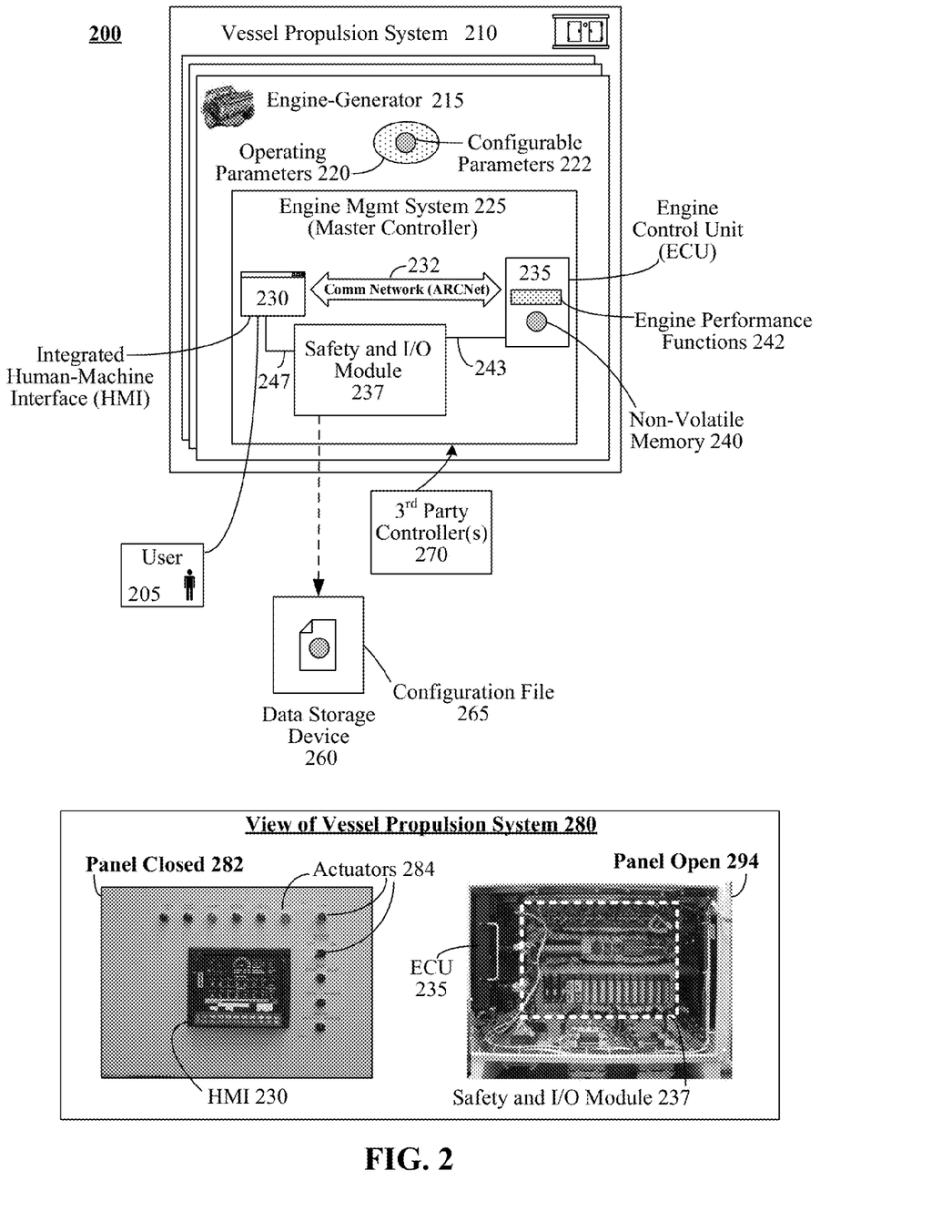
FIG. 2 is a schematic diagram illustrating a system that utilizes a single safety and input/output (I/O) module for an engine-generator in accordance with embodiments of the invention.

FIG. 2 is a schematic diagram illustrating a system 200 that utilizes a single safety and I/O module 237 for an engine-generator 215 of a vessel propulsion system 210 or other system in accordance with embodiments of the invention.

Components of the vessel propulsion system 210 of particular relevance to the present disclosure can include one or more engine-generators 215, which include an engine management system 225. An engine-generator 215 can represent the assemblage of components required for converting a fuel source into electricity. The specific configuration of components of an engine-generator 215 can vary based on manufacturer and purpose; however, generally speaking, an engine-generator 215 may include a fuel source, an engine, an engine speed regulator, a generator, a generator voltage regulator, as well as systems for handling exhaust, cooling, and lubrication. In marine propulsion applications (as shown), the engine speed regulator can be a variable speed regulator, while in other applications, a constant engine speed regulator (e.g., a governor) can be used.

To elaborate, in a marine propulsion application, an engine control unit (ECU) 235 can regulate engine speed from idle to rated based on throttle commands from a primary control location, e.g., the captain's room or bridge. Thus, a speed command is conveyed over wiring of a ship (e.g., a ship's bridge-to-ECU communications system). The HMI 230 can be used to calibrate this communication channel (from 4 to 20 mA typically) and throttle-level, which can be any value between idle and rated. Improper calibration of this throttle command can result in the engines operating at non-desired speeds (e.g., speeds other than those selected by a captain), which can result in loss of fuel efficiency and a lack of marine vessel responsiveness to a captain's directions. Safety and I/O module 237 can monitor non-desired conditions and can provide alerts, notifications, logs, etc.

Operating parameters 220 of the engine-generators 215 can be constantly monitored and automatically adjusted by the engine management system 225. The operating parameters 220 can represent values or limits for input/output variables for the engine-generator 215. The engine management system 225 can utilize the values of the operating parameters 220 when determining when and/or how operation of the engine-generator 215 should be adjusted.

For example, should the engine management system 225 determine that the operating speed of the engine component needs to be increased in order to increase marine vessel speed (e.g., engine power output) and/or power generation, the engine management system 225 can accelerate the engine based upon the "increase speed acceleration rate" operating parameter 220. In a marine vessel application, this "increase speed acceleration rate" operating parameter 220 can be increased responsive to a captain adjusting a throttle on the bridge of the vessel. Adjustments can also be made from the HMI 230 by maintenance crew users during engine tuning/calibration.

A subset of the operating parameters 220 can be designated as configurable operating parameters 222. Values for the configurable operating parameters 222 can be modified by the user 205 for the purposes of calibrating/tuning operation of the engine-generator 215. Conversely, values of the operating parameters 220 not included in the subset of configurable operating parameters 222 cannot be modified by the user 205.

Examples of configurable operating parameters 222 can include, but are not limited to, the air-to-fuel ratio lower limit, static fuel limit values, increase speed acceleration rate, decrease speed deceleration rate, percent droop, and the like. Definition of the configurable operating parameters 222 can occur during production of the engine-generator 215 and can allow for further customization by the user 205 after installation.

The engine management system 225 comprises hardware and/or software elements configured to monitor and adjust the operating parameters 220 of the engine-generator 215. The engine management system 225 may comprise numerous components. In the system 200 as shown in FIG. 2, however, only those components of the engine management system 225 directly involved with the implementation and/or functionality of the present invention have been illustrated.

In an embodiment, the engine management system 225 includes an integrated HMI 230, an engine control unit (ECU) 235, and the safety and I/O module 237. The HMI 230 is operable to communicate with the ECU 235 over ARCnet 232 (or an equivalent communication link, network, or bus). The ECU 235 can be a separate hardware component that runs the software components, such as a speed regulator, providing fuel injection commands, etc. The ECU 235 can run standalone with the already configured parameters (which can be stored in non-volatile memory 240 to prevent loss of values power loss, a power-up cycle). Thus, in an event of communication loss (e.g., a problem with ARCNet 232) or an HMI 230 problem, the ECU 235 can continue to operate (using a last established set of parameters 222) until communications with the HMI 230 are restored (which can update the parameters the ECU 235 uses). The integrated HMI 230 comprises hardware and/or software configured to provide a graphical interaction mechanism in which the user 205 can perform functions relating to the configurable operating parameters 222 of the engine-generator 215. That is, at least a subset of the HMI 230 entered values (e.g., a subset related to ECU 235 functions) for the parameters 220 can be routed through the ECU 235.

The integrated HMI 230 can include a display screen and keypad encased within the housing of the engine-generator 215. The components supporting the processing logic and graphical menus of the integrated HMI 230 can also be accommodated within an appropriate location of the engine-generator's 215 housing like a designated control area where the sensitive components can be protected from the environmental stresses of operation (e.g., heat and vibration).

The integrated HMI 230 is a robust interface and not a dumb terminal or control panel. The engine management system (e.g., system 210) can include configuration management and engine protection diagnostics that runs within the HMI hardware 230 apart from the display shown to a user. While the engine-generator 215 may still have a control panel for quick access to functions like power up/off and emergency stop, the integrated HMI 230 can be utilized by the user 205 to calibrate or fine-tune values for the configurable operating parameters 222 of the engine-generator 215 in the field (post-installation).

The master controller (the EMS 225) can adjust or power-up/down engine-generators 215 for load balancing, conformance to operational policies, or to handle a detected problem. Thus, the master controller can provide the engine management system 225 with operating parameters 220 values to accommodate these situations as they arise. The safety and I/O module 237 can detect conditions related to safety and can situationally trigger engine performance functions 242 (directly using direct link 243), as necessary.

Storage of the configurable operating parameters 222 can also support an up/down load functionality to assist in the calibration of multiple engine-generators 215. Upon selection of the corresponding command by the user 205, the engine management system 225 can package the configurable operating parameters 222 as a configuration file 265. The configuration file 265 of data storage device 260 can be a formatted electronic representation of the configurable operating parameters 222 that the engine management system 225 can read and write.

View 280 of FIG. 2 shows a non-limiting implementation example in a marine propulsion context. Specifically, the view 280 shows how the HMI 230, the safety and I/O module 237, and the ECU 235 can be integrated in an accessible and compact space near the ECU 235 in one contemplated embodiment. Specifically, a panel-closed view 282 shows a HMI 230 with a set of actuators 284 (buttons, switches, dials, etc.), which can be adjusted by a user. More than one HMI 230 can be implemented in a marine vessel. For example, one HMI 230 can be located proximate to the ECU 235 (as shown) and another different HMI 230 can be located in the vessel's bridge. When the panel is opened 294, various connections can be seen, such as the ECU 235 and module 237.

FIG. 3 is a schematic diagram illustrating an interface 310 for facilitating unification of marine vehicle engine management in accordance with an embodiment of the inventive arrangements disclosed herein. Specifically, interface 310 represents a sample screen from HMI 230 that shows values relating to engine safety (from safety and I/O module 237, for example).

That is, in an embodiment of the interface 310, engine performance characteristics are presented for an operator to view. Elements 312-322 may be interactive elements. In one instance, interface 310 can be a common functional display of a diagnostic system. The interface 310 can be customizable based on marine vehicle capabilities, engine functionality, available sensor data, operator preferences, and the like. For example, interface 310 can conform to a traditional gauge panel layout.

In section 312, engine performance characteristics are presented in real-time. Section 312 can conform to traditional and/or proprietary display formats including, textual data, graphical data, and the like. In one embodiment, section 312 presents multiple engine data simultaneously. In another embodiment, section 312 presents engine data for each engine independently (in the case of a system having plural engines). That is, a screen for each engine can be presented upon request.

In section 314-318, engine parameters are visually presented within a portion of the interface 310. Engine parameters can include, but are not limited to, temperature, pressure, speed, power, flow, and the like. In one instance, section 314-318 presents historical sensor information collected from sensors associated with an engine. In another instance, section 314-318 presents current sensor data/information in real-time enabling a "top-level" view of engine performance. In section 314-318, sensor information is presented textually, graphically, or the like. For example, the interface 310 may be configured to display digital renditions of an analog gauge(s).

In section 320, notifications are presented in response to a safety trigger correspondence. Notifications can be visually presented, audibly presented, or the like. In one embodiment, a notification of engine overspeed can be textually presented within section 320 simultaneously with an audible alert. In one embodiment, an audible alert is presented proximate to a computing device associated with the interface 310. In one instance, section 320 is an operator message block of a diagnostic interface. Section 320 can present any type of notification (e.g., notifications from notification module 160).

In section 322, operator actions are selectively presented based on section 312-318 state, section 320 notifications, and the like. Operator actions can include, but are not limited to, engine control actions, user interface actions, configuration actions, or the like. In one embodiment, section 320 permits an operator to dismiss a notification, alert, alarm, warning, and the like. For example, a "silence" key can be interactively operated to allow notifications to be easily dismissed. In one instance, section 322 can be an interactive element conforming to a "soft" button. For example, section 322 can be presented within a touch sensitive portion of a computing display. It should be appreciated that selection of elements within section 322 can alter the presentation of section 312-318. For instance, selecting a data download option within section 322 can present a data download menu within section 314.

The flowchart and block diagrams in FIGS. 1-3 illustrate the architecture, functionality, and operation of possible implementations of systems, methods and computer program products according to various embodiments of the present invention. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

One embodiment relates to a module for an engine controller. This module comprises a safety and input/output (I/O) module that is physically distinct from an engine control unit (ECU) of an engine controller for an engine (e.g., engine set) of a marine vessel, generator set, or other system in which the engine is used. The safety and I/O module includes hardware in addition to software. The safety and I/O module comprises a single controller having safety functionality and I/O functionality. The safety functionality is embodied in hardware and/or software configured for dynamic engine protection during operation of the engine of the marine vessel or other system. The I/O functionality is embodied in hardware and/or software configured to control sending signals to components external to the engine controller and receiving signals from components external to the engine controller.

Another aspect of the disclosure is for an engine controller including an engine control unit (ECU) and a safety and I/O module. The ECU can include hardware and/or software; in one embodiment, it includes both. The ECU is operable to regulate engine speed and to stop at least one engine in response to a determined set of emergency conditions. The safety and I/O module is physically distinct from the ECU. The safety and I/O module comprises a single controller having functionality for engine protection during operation and for signal communication in and out of the engine controller. The safety and I/O module detects conditions from a set of sensors, and triggers control actions when the sensed conditions are outside previously established (designated) operating thresholds. The safety and I/O module can also convey commands to the ECU to dynamically change engine operating conditions responsive to the occurrence of events that are linked to the set of emergency conditions.

Another embodiment relates to a method for providing engine controllers for a set of different marine vessels having different engine sets. In the method, a set of safety and I/O modules is provided; one for each of the engine controllers of the different marine vessels. Each of the safety and I/O modules is a software/firmware configurable unit for operating in conjunction with the different marine vessels having different engine sets without requiring any hardware changes to the safety and input/output module. Each safety and I/O module comprises a single controller having safety functionality and I/O functionality. The safety functionality can be for dynamic engine protection during operation of an engine set of one of the different marine vessels. The I/O functionality can be for sending signals to components external to the engine controller and for receiving signals from components external to the engine controller. In the method, a set of human-machine interface (HMI) components is identified. Each of the HMI components can be a software/firmware configurable unit for operating in conjunction with the different marine vessels having different engine sets without requiring any hardware changes to the HMI component. Each HMI can be operable to visually display conditions of engine parameters monitored by the safety and I/O module in real-time. Each HMI can also function as an alarm module that presents alerts when sensed conditions are outside the previously established operating thresholds as determined by safety functionality of one of the safety and I/O modules. The method also comprises identifying a set of ECUs, one for each of the engine controllers. Each of the ECUs can regulate engine speed and to stop engines of the engine set of the different marine vessels in response to a determined set of emergency conditions, which are determined by safety functionality of one of the safety and I/O modules. Each ECU can be specifically manufactured for one of the different engine sets of one of the different marine vessels. That is, each ECU can require hardware specific changes that are unique to the different engine set that the ECU supports. The engine controller can be assembled for each of the different engine sets by combining an ECU with one of the safety and I/O modules, and with at least one of the HMI components.

According to one aspect, "dynamic" control (e.g., protection) of an engine refers to monitoring the engine in operation and concurrently controlling the engine, responsive to the monitoring, for example, to prevent the engine from operating in a manner that could result in damage to the engine or related systems, or to reduce or minimize the extent to which the engine operates in such a manner.

Embodiments of the invention are described herein in the context of an engine. All such embodiments are additionally applicable to engine sets, meaning a group of plural engines that are controlled in coordination, e.g., for a common purpose such as generating electricity or moving a propeller shaft.

Another embodiment relates to a system for an engine. The system comprises a safety and input/output module that is physically distinct from an engine control unit of an engine controller for an engine. The safety and input/output module comprises hardware in addition to software. The safety and input/output module is configured to dynamically protect the engine during operation of the engine, and to communicate signals with components external to the engine controller.

In another embodiment, the safety and input/output module comprises a single controller that includes the hardware and software.

In another embodiment, the safety and input/output module includes an alarm module and is operable to receive information relating to sensed conditions from a set of sensors. The safety and input/output module is further operable, if the sensed conditions are outside designated operating thresholds, to: convey commands to the engine control unit to dynamically change engine operating conditions; and convey signals to the alarm module to present an alert.

In another embodiment, the safety and input/output module is implemented in a single hardware panel, which is one of a plurality of different panels of the engine controller. The engine control unit and a human-machine interface are each also one of the plurality of different panels of the engine controller.

In another embodiment, the safety and input/output module is configurable for operating in conjunction with a plurality of different engine sets without requiring any hardware changes to the safety and input/output module.

In another embodiment, the safety and input/output module is operable with a plurality of different engine control units. Each engine control unit is configured for controlling one of a plurality of different engine sets and requires hardware specific changes that are unique to the engine set that the engine control unit is configured to control.

In another embodiment, the safety and input/output module comprises its own power up cycle to become operational, which is distinct and different from a power-up cycle of the engine control unit.

In another embodiment, the safety and input/output module is operable to communicate with a human-machine interface, which is a configurable unit configured to operate in conjunction with a plurality of different engines sets.

In another embodiment, the safety and input/output module is physically distinct from a human-machine interface of the engine controller. The human-machine interface is configured to visually display engine conditions monitored by the safety and input/output module, and to present alerts when the engine conditions are outside designated operating thresholds.

In another embodiment, the engine, engine controller, and safety and input/output module are deployed in a vehicle, and the system comprises a plurality of human-machine interfaces in the vehicle. The human-machine interfaces are configured to concurrently operate and communicate with the safety and input/output module in real-time.

In another embodiment, the safety and input/output module is physically distinct from at least one alarm module implemented external to the engine controller. The safety and input/output module is configured to communicate with the alarm module for initiating alarms.

In another embodiment, the safety and input/output module is configured to at least one of, based on information relating to sensed conditions of the engine: override manual user inputs for controlling the engine; engage slowdown procedures of the engine; control the engine into an idle mode; or control an emergency full stop of the engine.

In another embodiment, the safety and input/output module is configured for logging parameter values to a persistent memory upon occurrence of a safety event. The safety event comprises when one or more of a plurality of sensed conditions are outside designated operating thresholds for engine operation. The safety and input/output module is configured to log parameter values as they exist before the safety event, log parameter values during the safety event, and log parameter values after the safety event.

In another embodiment, different configurable sampling rates are implemented by the safety and input/output module for logging the parameter values before the safety event, during the safety event, and after the safety event.

Another embodiment relates to an engine controller. The engine controller comprises a safety and input/output module and an engine control unit. The engine control unit comprises hardware as well as software and is operable to regulate engine speed of an engine and to control the engine responsive to commands received from the safety and input/output module. The safety and input/output module comprises hardware as well as software and is physically distinct from the engine control unit. The safety and input/output module is configured to receive information relating to sensed conditions from a plurality of sensors, and, if the sensed conditions are outside designated operating thresholds, convey the commands to the engine control unit to change engine operations.

In another embodiment, the safety and input/output module comprises a single controller having the hardware and software.

In another embodiment, the safety and input/output module is configured to convey the commands to the engine control unit to stop the engine if one or more of the sensed conditions are outside one or more of the designated operating thresholds that are indicative of a designated emergency condition.

In another embodiment, the engine controller further comprises a human-machine interface that is physically distinct from the engine control unit and from the safety and input/output module. The human-machine interface is operable to visually display the sensed conditions and to present alerts responsive to the safety and input/output module and/or when the sensed conditions are outside the designated operating thresholds.

In another embodiment, the engine controller is deployed in a marine vessel, and the engine controller comprises a plurality of human-machine interfaces. A first one of the plurality of human-machine interfaces is present in a bridge of the marine vessel and a second one of the plurality of human-machine interfaces is present in an engine room of the marine vessel. The plurality of human-machine interfaces are configured to concurrently and cooperatively operate, communicate with the engine control unit via the safety and input/output module, and present alerts responsive to the safety and input/output module and/or when the sensed conditions are outside the designated operating thresholds.

In another embodiment, the safety and input/output module is configured to at least one of, based on the information relating to the sensed conditions: override manual user inputs for controlling the engine; communicate with the engine control unit to engage slowdown procedures of the engine; communicate with the engine control unit to control the engine into an idle mode; or communicate with the engine control unit to control an emergency full stop of the engine.

In another embodiment, the engine controller further comprises at least one alarm module that is physically distinct from the engine control unit and from the safety and input/output module. The at least one alarm module is configured to present alerts when the sensed conditions are outside the previously established operating thresholds. The at least one alarm module is configured to communicate with the engine control unit via the safety and input/output module.

In another embodiment, the safety and input/output module establishes different operating thresholds and conditions for different configurable modes. The modes comprise a normal operating mode; a pre-lube operating mode; and an engine start/stop mode, which comprises one or more of an energy saver mode, a low noise mode, a fuel saver mode, or a low exhaust mode.

Another embodiment relates to a method for providing engine controllers for a plurality of different marine vessels having different engines. The method comprises producing a plurality of safety and input/output modules, one for each of the engine controllers of the different marine vessels. Each of the safety and input/output modules is configurable for operating in conjunction with the different marine vessels without requiring any hardware changes to the safety and input/output module. The safety and input/output modules are configured for dynamic engine protection during operation of the engines of the marine vessels and for communicating signals with components external to the engine controllers. The method further comprises identifying a plurality of human-machine interface components, at least one for each of the engine controllers. Each of the human-machine interface components is configurable for operating in conjunction with the different marine vessels without requiring any hardware changes to the human-machine interface component. The human-machine interface components are operable to visually display conditions of engine parameters monitored by the safety and input/output modules. The human-machine interface components are configured to present alerts when the engine parameters are outside designated operating thresholds as determined by the safety and input/output modules. The method further comprises identifying a plurality of engine control units, one for each of the engine controllers. The engine control units are operable to regulate engine speed and to stop the engines of the different marine vessels in response to one or more sets of emergency conditions as determined by the safety and input/output modules. Each of the engine control units is specifically configured for operation with the engine of one of the different marine vessels and requires hardware specific changes that are unique to the engine of said one of the different marine vessels. The method further comprises assembling an engine controller for each of the different marine vessels having different engines by operably coupling one of the engine control units with one of the safety and input/output modules and with at least one of the human-machine interface components.

In another embodiment, the method further comprises, for each engine controller, configuring the safety and input/output module of the engine controller to settings of an engine and marine vessel for which the engine controller is to be used. The assembled engine control unit, the safety and input/output module, and the at least one human-machine interface component are configured to operate together to control engine speed of the engine, and, based on sensed conditions relative to designated operating thresholds or other parameters: to signal alarms; to override manual user inputs for controlling the engine; to control a slowdown operation of the engine; and to control an emergency full stop of the engine.

In the appended claims, the terms "including" and "having" are used as the plain-language equivalents of the term "comprising"; the term "in which" is equivalent to "wherein." Moreover, in the following claims, the terms "first," "second," "third," "upper," "lower," "bottom," "top," etc. are used merely as labels, and are not intended to impose numerical or positional requirements on their objects. As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. Moreover, certain embodiments may be shown as having like or similar elements, however, this is merely for illustration purposes, and such embodiments need not necessarily have the same elements unless specified in the claims.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

What is claimed is:

1. A system comprising:
a vehicle having a vehicle propulsion system with an engine;
a housing;
a safety and input/output module inside the housing; and
an engine control unit inside the housing, wherein the engine control unit is tailored to the engine and thereby constrained for use with specific hardware of the engine;
wherein the safety and input/output module is physically distinct from the engine control unit;
wherein the safety and input/output module is configured to dynamically protect the engine during operation of the engine;
wherein the safety and input/output module is configured to communicate signals with components external to the engine control unit;
wherein the safety and input/output module is configured to communicate with a network that is external to at least one of the vehicle propulsion system or the vehicle, and
wherein the safety and input/output module is configured for utilization with a plurality of different engine controllers that are respectively constrained for use with plural different engines having different hardware configurations.

2. The system of claim 1, wherein the safety and input/output module is configured to communicate with the network that is external to the vehicle, the network including the Internet.

3. The system of claim 1, wherein the safety and input/output module includes an alarm module and is operable to:
receive information relating to sensed conditions from a set of sensors; and
if the sensed conditions are outside designated operating thresholds:
convey commands to the engine control unit to dynamically change engine operating conditions; and
convey signals to the alarm module to present an alert.

4. The system of claim 1, wherein the safety and input/output module is implemented in a single hardware panel, which is one of a plurality of different panels in the housing, wherein the engine control unit and a human-machine interface are each also one of the plurality of different panels in the housing.

5. The system of claim 1, wherein the safety and input/output module is configured for operating with the plurality of different engine controllers without requiring any hardware changes to the safety and input/output module.

6. The system of claim 1, wherein each of the engine controllers is configured for controlling a different engine and requires hardware specific changes that are unique to the engine that the engine controller is configured to control.

7. The system of claim 1, wherein the safety and input/output module comprises its own power up cycle to become operational, which is distinct and different from a power-up cycle of the engine control unit.

8. The system of claim 1, wherein the safety and input/output module is operable to communicate with a human-machine interface, which is a configurable unit configured to operate in conjunction with a plurality of different engines sets.

9. The system of claim 1, wherein the safety and input/output module is physically distinct from a human-machine interface in the housing, wherein the human-machine interface is configured to visually display engine conditions monitored by the safety and input/output module, and to present alerts when the engine conditions are outside designated operating thresholds.

10. The system of claim 9, wherein the system comprises a plurality of human-machine interfaces in the vehicle, wherein the human-machine interfaces are configured to concurrently operate and communicate with the safety and input/output module in real-time.

11. The system of claim 1, wherein the safety and input/output module is physically distinct from at least one alarm module implemented external to the engine control unit, and wherein the safety and input/output module is configured to communicate with the alarm module for initiating alarms.

12. The system of claim 1, wherein the safety and input/output module is configured to at least one of, based on information relating to sensed conditions of the engine: override manual user inputs for controlling the engine; engage slowdown procedures of the engine; control the engine into an idle mode; or control an emergency full stop of the engine.

13. The system of claim 1, wherein the safety and input/output module is configured for logging parameter values to a persistent memory upon occurrence of a safety event, the safety event comprising when one or more of a plurality of sensed conditions are outside designated operating thresholds for engine operation, wherein the safety and input/output module is configured to log parameter values as they exist before the safety event, log parameter values during the safety event, and log parameter values after the safety event.

14. The system of claim 13, wherein different configurable sampling rates are implemented by the safety and input/output module for logging the parameter values before the safety event, during the safety event, and after the safety event.

15. An engine controller comprising:
a safety and input/output module; and
an engine control unit operable to regulate engine speed of a particular engine and to control the engine responsive to commands received from the safety and input/output module;
wherein the safety and input/output module is physically distinct from the engine control unit, and wherein the safety and input/output module is configured to receive information relating to sensed conditions from a plurality of sensors, and, if the sensed conditions are outside designated operating thresholds, convey the commands to the engine control unit to change engine operations;
wherein the safety and input/output module is configured to communicate with an external network; and
wherein the safety and input/output module is configured for utilization with a plurality of different engine controllers that are respectively constrained for use with plural different engines having different hardware configurations.

16. The engine controller of claim 15, wherein the engine controller and the particular engine are disposed in a vehicle, and the safety and input/output module is configured to communicate with the external network that is external to the vehicle.

17. The engine controller of claim 15, wherein the safety and input/output module is configured to convey the commands to the engine control unit to stop the engine if one or more of the sensed conditions are outside one or more of the designated operating thresholds that are indicative of a designated emergency condition.

18. The engine controller of claim 15, further comprising:
a human-machine interface that is physically distinct from the engine control unit and from the safety and input/output module, wherein the human-machine interface is operable to visually display the sensed conditions and to present alerts responsive to the safety and input/output module and/or when the sensed conditions are outside the designated operating thresholds.

19. The engine controller of claim 18, wherein the engine controller is deployed in a marine vessel, and the engine controller comprises a plurality of human-machine interfaces, a first one of the plurality of human-machine interfaces being present in a bridge of the marine vessel and a second one of the plurality of human-machine interfaces being present in an engine room of the marine vessel, wherein the plurality of human-machine interfaces are configured to concurrently and cooperatively operate, communicate with the engine control unit via the safety and input/output module, and present alerts responsive to the safety and input/output module and/or when the sensed conditions are outside the designated operating thresholds.

20. The engine controller of claim 15, wherein the safety and input/output module is configured to at least one of, based on the information relating to the sensed conditions:

override manual user inputs for controlling the engine; communicate with the engine control unit to engage slowdown procedures of the engine; communicate with the engine control unit to control the engine into an idle mode; or communicate with the engine control unit to control an emergency full stop of the engine.

21. The engine controller of claim 15, further comprising:
at least one alarm module that is physically distinct from the engine control unit and from the safety and input/output module;
wherein the at least one alarm module is external to the engine controller; and
wherein the at least one alarm module is configured to present alerts when the sensed conditions are outside the previously established operating thresholds, and wherein the at least one alarm module is configured to communicate with the engine control unit via the safety and input/output module.

22. The engine controller of claim 15, wherein the safety and input/output module establishes different operating thresholds and conditions for different configurable modes, the modes comprising:
a normal operating mode;
a pre-lube operating mode;
an engine start/stop mode, which comprises one or more of an energy saver mode, a low noise mode, a fuel saver mode, or a low exhaust mode.

23. A system comprising:
an engine;
a safety and input/output module; and
an engine control unit, wherein the engine control unit is configured for engine control use only with specific hardware of the engine;
wherein the safety and input/output module is physically distinct from the engine control unit and is configured to dynamically protect the engine during operation of the engine by conveying commands to the engine control unit responsive to receiving information relating to sensed engine operation conditions from a plurality of sensors;
wherein the safety and input/output module is configured to communicate with an external network; and
wherein the safety and input/output module is configured for utilization both with the engine control unit and a plurality of additional, different engine control units that are respectively operable only with different engines having different hardware configurations.

24. A system comprising:
an engine;
a housing; and
an engine controller comprising a safety and input/output module and an engine control unit;
wherein the safety and input/output module and the engine control unit are inside the housing;
wherein the engine control unit is tailored to the engine and thereby constrained for use with specific hardware of the engine;
wherein the safety and input/output module is physically distinct from the engine control unit;
wherein the safety and input/output module is configured to dynamically protect the engine during operation of the engine;
wherein the safety and input/output module is configured to communicate signals with components external to the engine control unit;
wherein the safety and input/output module is configured to communicate signals with components external to the engine controller; and
wherein the safety and input/output module is configured for utilization with a plurality of different engine controllers that are respectively constrained for use with plural different engines having different hardware configurations.

25. The system of claim 24, wherein the safety and input/output module is configured to communicate with an external network.

26. The system of claim 25, further comprising:
at least one alarm module that is physically distinct from the engine control unit and from the safety and input/output module;
wherein the at least one alarm module is external to the engine controller; and
wherein the at least one alarm module is configured to present alerts when sensed conditions are outside previously established operating thresholds, and wherein the at least one alarm module is configured to communicate with the engine control unit via the safety and input/output module.

* * * * *